(12) United States Patent
Hu

(10) Patent No.: US 7,704,292 B2
(45) Date of Patent: Apr. 27, 2010

(54) FLUID FILTER

(76) Inventor: Ruihua Hu, 01 Jinxin Rd., Nancun-Yuanggang, Panyu Guangzhou (CN)

(*) Notice: Subject to any disclaimer, the term of this patent is extended or adjusted under 35 U.S.C. 154(b) by 698 days.

(21) Appl. No.: 10/576,382

(22) PCT Filed: Dec. 6, 2004

(86) PCT No.: PCT/CN2004/001415
§ 371 (c)(1),
(2), (4) Date: Apr. 18, 2006

(87) PCT Pub. No.: WO2005/058460
PCT Pub. Date: Jun. 30, 2005

(65) Prior Publication Data
US 2007/0144960 A1    Jun. 28, 2007

(30) Foreign Application Priority Data
Dec. 17, 2003  (CN) .................... 2003 1 0117410
Sep. 8, 2004   (CN) .................... 2004 2 0083806 U

(51) Int. Cl.
*B01D 46/00* (2006.01)
(52) U.S. Cl. ............... 55/385.3; 55/497; 55/521; 55/498; 55/523; 55/525; 55/DIG. 30
(58) Field of Classification Search ............ 55/481, 55/521, 523, DIG. 30, 385.3, 498, 497, 525, 55/484; 422/174, 177, 179, 180, 221, 100, 422/222; 60/301, 299, 300
See application file for complete search history.

(56) References Cited

U.S. PATENT DOCUMENTS

| | | | | |
|---|---|---|---|---|
| 4,537,812 A * | 8/1985 | Elbers | ............ | 428/182 |
| 4,610,706 A * | 9/1986 | Nesher | ............ | 55/497 |
| 6,534,021 B1 * | 3/2003 | Maus | ............ | 422/180 |
| 6,544,310 B2 * | 4/2003 | Badeau et al. | ............ | 55/385.3 |
| 6,582,490 B2 * | 6/2003 | Miller et al. | ............ | 55/520 |
| 7,258,719 B2 * | 8/2007 | Miller et al. | ............ | 55/521 |
| 2003/0182909 A1 * | 10/2003 | Gieseke et al. | ............ | 55/385.3 |
| 2005/0022484 A1 * | 2/2005 | Krisko et al. | ............ | 55/337 |
| 2006/0130451 A1 * | 6/2006 | Ding et al. | ............ | 55/524 |
| 2006/0163150 A1 * | 7/2006 | Golden et al. | ............ | 210/493.1 |
| 2009/0064860 A1 * | 3/2009 | Sporre et al. | ............ | 95/280 |
| 2009/0151311 A1 * | 6/2009 | Reichter et al. | ............ | 55/497 |

* cited by examiner

*Primary Examiner*—Duane Smith
*Assistant Examiner*—Minh-Chau T Pham
(74) *Attorney, Agent, or Firm*—Raymond Y. Chan; David and Raymond Patent Firm

(57) ABSTRACT

The present invention discloses a fluid filter for screening carbon-microparticles exhausted from diesel engines, such filter has two types of structure, i.e. the plate type and the preferable tube type, which includes plurality of multilayer corrugated filtering rings and flat filtering rings, a central tube, and an outer casing; the innermost layer of the flat filtering rings is welded onto the central tube, and the outermost layer of the flat rings is welded onto the outer casing; the multi-layer corrugated filter rings are coaxially alternated within the flat filtering rings and formed with a zigzag manner, wherein side edges of each of the corrugated filtering rings are respectively welded onto neighboring flat filtering rings so as to form a continuous filter core with 'Z' shaped side endings, wherein two sides of the Z shaped side endings of said filter core are alternatively applied as fluid inlet and fluid outlet.

6 Claims, 6 Drawing Sheets

FLUID FILTER

BACKGROUND OF THE PRESENT INVENTION

1. Field of Invention

The present invention relates to fluid filter, and more particularly, relates to a kind of fluid filter for screening microparticles of diesel exhaust gas in practices.

2. Description of Related Arts

It is rather common to separate fluid into different phases for a variety of purposes. In order to successfully complete gas/solid separation, liquid/solid separation, and/or gas/liquid separation for fluid, leaf filters, bag filters, tube filters as well as pleat filters have been extensively employed in a range of applications respectively for filtering different type of fluids.

On the other hand, diesel engines applied in vehicles, industrial machineries, construction machineries, agriculture tools, and vessels unexceptionally discharge exhaust gas containing micro-size particles thus causing serious air pollution. However, there are no successful fluids filters have been introduced into the market for outstandingly filtering such microparticles. For example, the porcelain filters are not breathable, and are widely complained with significant fluid pressure drop, lower carrying capacity; the bag filters prepared by metal wool, the plead filters and the tube filters have are complained of the smaller size of serviceable area, bulky and inefficiency.

SUMMARY OF THE PRESENT INVENTION

A primary object of the present invention is to provide a fluid filter for screening carbon microparticles contained in diesel exhausted gas, wherein such fluid filter has an enlarged serviceable area, improved carrying capacity, and meanwhile with an economical size.

Another object of the present invention is to provide a fluid filter for screening carbon microparticles contained in diesel exhausted gas, wherein the fluid filter could be prepared with different types, such as plate types and tube types for ensuring different applications in practices.

1. Plate Type

The plate type fluid filter comprises an outer casing, and a filter assembly received within the outer casing, wherein the filter assembly comprises a plurality of corrugated filtering plates, and a plurality of flat filtering plates alternated into the corrugated filtering plates with a 'Z' shaped manner so as to overlap with corrugated filtering plates to form a Z-filter stack, wherein the side edges of the corrugated filtering plates are reserved with plain edge and the middle portion is prepared with corrugated shape as shown in FIG. 2.

Each of the corrugated filtering plates is respectively welded onto a pair of neighboring flat filtering plates at opposed edges, such that the filter stack is laterally closed with a plurality of Z shaped side alternatively applied as fluid inlet and fluid outlet in applications as shown in FIG. 1A and FIG. 1B.

Due to the fact that each of the corrugated plate is respectively welded onto a pair of neighboring flat filtering plates, there are a plurality of side openings 3, 4 would be formed at two ends of the filter stack alternatively applied as fluid inlet and fluid outlet in applications as shown in FIG. 1A and FIG. 1B.

Preferably, the quantity of the corrugated and flat filtering plates is depending on the prospective size and capacity of the fluid filter, wherein the height of the filter is ranged between 2-10 mm and the crest interval L of the corrugated plate peaks is ranged between 4-20 mm.

As shown in FIG. 3, the filter stack is disposed with the folding position to be inserted into the outer casing 5. Furthermore, the sealing glue is applied onto the side wall of the outer casing 5 and the sides of the filter stack so as to prevent the fluid from leaking outside. The type of the adhesive glue could be chosen according to the requirements and applications.

2. Tube Type

The tube type fluid filter comprises an outer casing 6', and a multi-layer corrugated filtering rings 1', a multi-layer flat filtering rings 2, and a central tube 6', wherein the innermost layer of the flat filtering ring is welded onto the central tube 5'; the outermost layer of the flat filtering ring is welded onto the inner surface of the outer casing; the multi-layer corrugated filter rings are coaxially alternated within the flat filtering rings and formed with a zigzag manner, wherein the side edges of the circular shaped corrugated filtering rings are respectively welded onto neighboring flat filtering rings so as to form a continuous filter core with 'Z' shaped sides. It is noted that two sides of the Z shaped side ends of the filter core are alternatively applied as fluid inlet 3' and fluid outlet 4' in applications as shown in FIG. 6, FIG. 10 and FIG. 11.

Accordingly, the corrugated filtering ring is prepared with a cylinder shape, wherein the two side ends are reserved with plain edges of 3-8 mm, and the middle portion is formed with corrugated shape for screening purposes. Accordingly, the flat filtering ring is prepared with cylinder shape as well.

In the meanwhile, the quantity of the corrugated and flat filtering rings is depending on the prospective size and capacity of the fluid filter, wherein the height H of each corrugated filtering ring/flat filtering ring of the filter is ranged between 2-10 mm. And the crest interval L of the corrugated peaks is depend onto the filter materials and ranged between 4-20 mm.

Compared with conventional fluid filter, the active filtering area per unit could significantly increased to an extent of 06-0.8 m$^2$/L, the pressure resistance of the fluid filter of is intensified to withstand higher fluid compact capacity, and to minimize the pressure drop in practices.

It is worth to mention that the fluid filter of tube shape has following advantages against the plate type filter. First of all, the outer layer of the filter assembly could be direction attached into the outer casing; secondly, the filter assembly of a cylinder shape would withstand an intensified pressure; finally, the cylinder shape structure would increase the manufacturing efficiency.

These and other objectives, features, and advantages of the present invention will become apparent from the following detailed description, the accompanying drawings, and the appended claims.

DETAILED DESCRIPTION OF THE PREFERRED EMBODIMENT

EXAMPLE 1

Cubic Shape Fluid Filter for Diesel Engine

The engine displacement is 2.0 L and the standard of the fluid filter is φ 130×200, the filter screening size is 1.5 m². It is noted that the corrugated filtering plate 1 and the flat filtering plate 2 are prepared by temperature resistant metal wire sintered cloth with a width of 200 mm and 0.3 mm thickness.

The outer casing of the filter is prepared with a stainless steel tube sizing as φ 130 (inner diameter)×220 (length)×2 (wall thickness).

The height H of each corrugated filtering plate/flat filtering plate of the filter is 3.5 mm, and the crest interval L of the corrugated plate peaks is 8 mm.

According to the preferred embodiment of the present invention, the plate type fluid filter is prepared by the following steps.

Figure 1A:
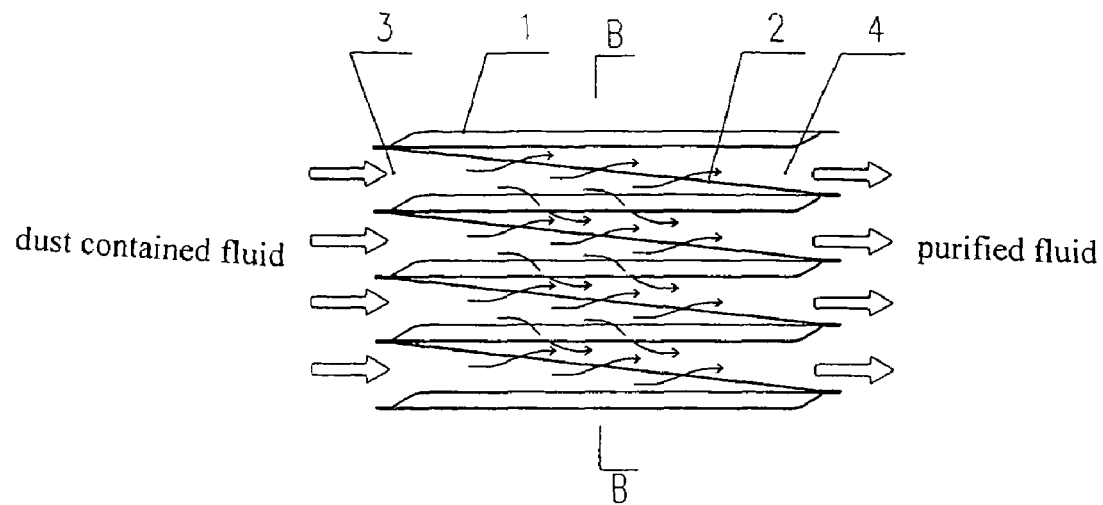
FIG. 1A is a schematic view illustrating the fluid flowing through the filter according to the preferred embodiment of the present invention, wherein the filter assembly is disposed with an overlapped stack manner.
Figure 1B:
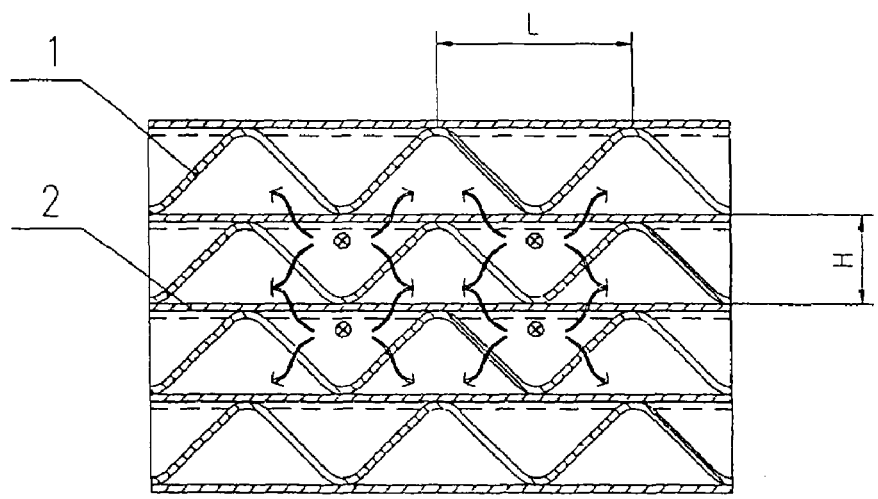
FIG. 1B is a sectional view of the above fluid filter showing the fluid is flowing through the filter assembly of the present invention.
Figure 2:
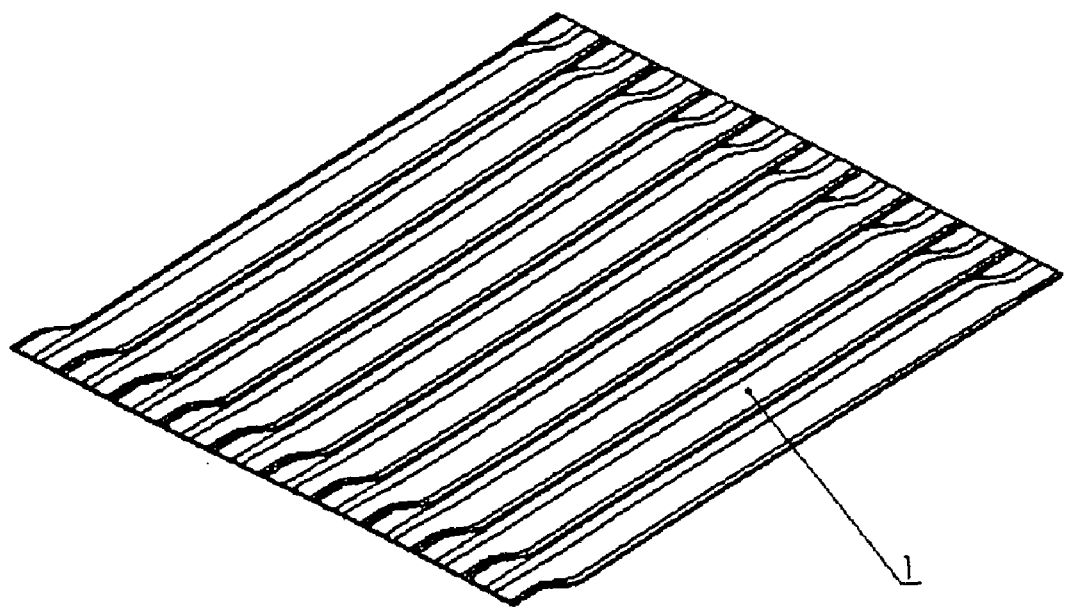
FIG. 2 is a perspective view of a corrugated filter leaf according to a preferred embodiment of the present invention.
Figure 3:
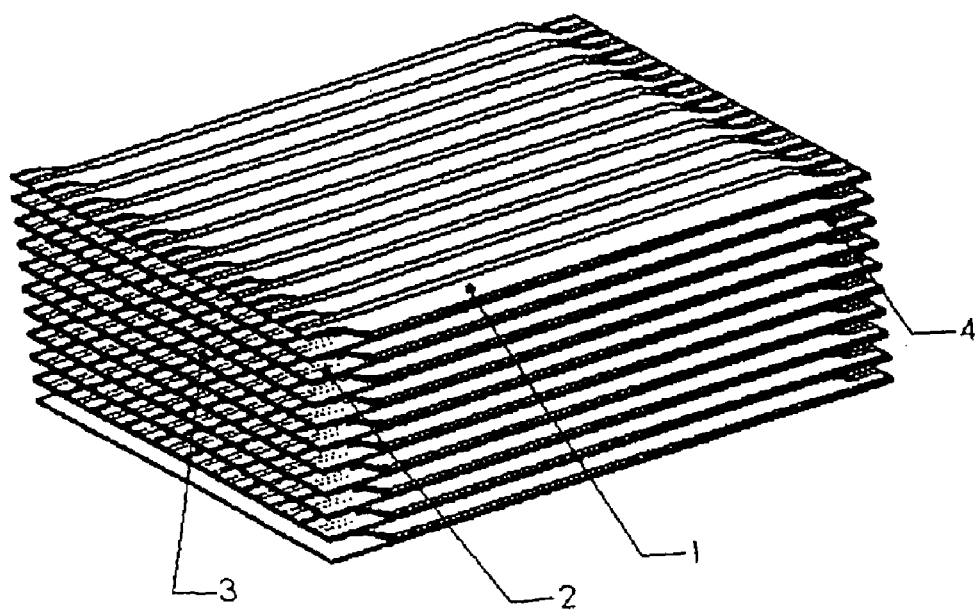
FIG. 3 is a perspective view showing the filter assembly before received into the outer casing according to a preferred embodiment of the present invention.
Figure 4:
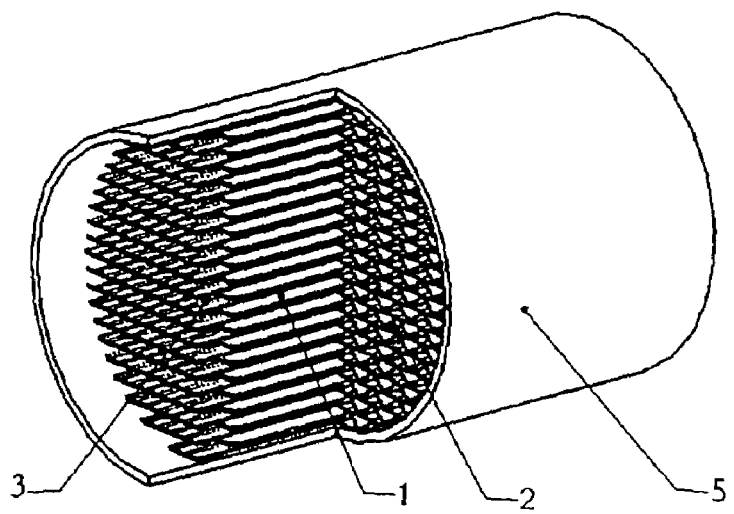
FIG. 4 is a perspective view of a fluid filter of cylinder shape according to a preferred embodiment of the present invention illustrating the inside structure.
Figure 5:
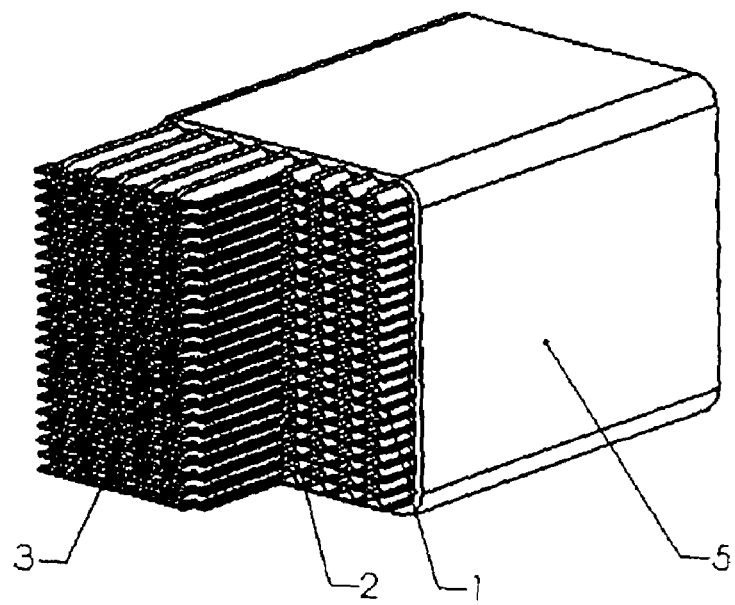
FIG. 5 is a perspective view of a rectangular shape fluid filter according to a preferred embodiment of the present invention.
Figure 6:
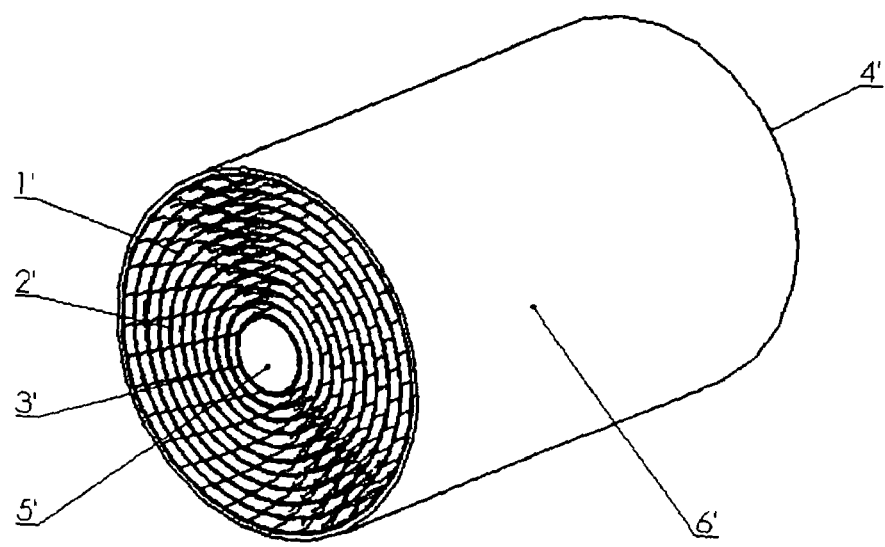
FIG. 6 is a perspective view of a fluid filter of tube shape according to a preferred embodiment of the present invention.
Figure 7:
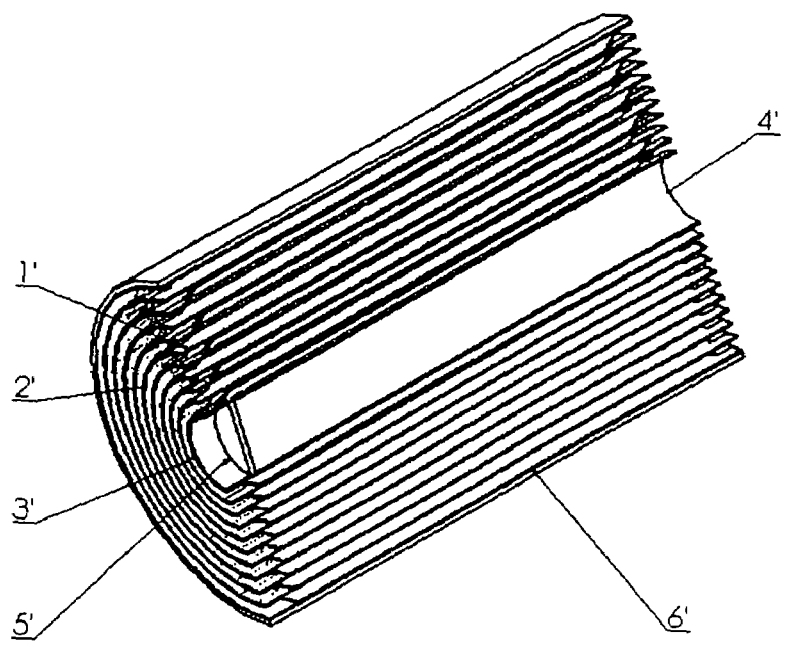
FIG. 7 is a sectional view of the above fluid filter of tube shape according to a preferred embodiment of the present invention.

First of all, the metal fiber sintered cloth is punched and extended laterally into a corrugated plate 1 as shown in FIG. 2, wherein the two side ends of the corrugated plate are reserved as 5 mm plain edges, wherein the crest height is 3.2 mm, the crest interval is 8 mm.

Secondly, the corrugated filtering plate 1 is overlapped and aligned with a flat filtering plate 2, one plain edge of the corrugated filtering plate is welded onto an adjacent flat filtering plate. Such that a plurality of corrugated filtering plate/flat filtering plate unit are formed one by one.

Thirdly, the plurality of corrugated filtering plate/flat filtering plate units respectively trimmed to ensure such plurality of plate units to be stacked up to form a stack having a round shape cross section wherein the diameter of such stack is 130 mm.

Fourthly, the plain edges of corrugated filtering plate and the flat filtering palte on the other side of the stack are welded with an alternated manner so as to extend the filter stack into a continuous strap wherein each of the corrugated filtering plate is respectively welded onto a pair of neighboring flat filtering plates at opposed edges.

Fifthly, the filter stack is compressed into a cylinder shape stack to be coated with organic high temperature fluid sealant, afterwards, such cylinder shape stack is inserted into the outer casing 5, wherein the symmetrical margins are reserved at two sides of the outer casing.

EXAMPLE 2

This example is adapted to prepare the cylinder shape fluid filter for diesel engine exhauster.

The prospected engine displacement is 2.0 L and the standard of the fluid filter is φ 130×190, the filtering size is 1.3 m². It is noted that the cylinder shape corrugated filter leaf 1' and cylinder shape flat filter leaf 2 are prepared by temperature resistant metal wire sintered cloth with a width of 190 mm and 0.3 mm thickness.

The outer casing of the filter is prepared with a stainless steel tube sizing as φ 130 (inner diameter)×22 (length)×2 (wall thickness).

The central tube is prepared with a close ended tube having a size of φ 130 (inner diameter)×22 (length)×2 (wall thickness).

The height A of each corrugated filtering plate/flat filtering plate unit of the filter is 3.8 mm, and the crest interval L of the corrugated plate peaks is 8.3 mm.

According to the preferred embodiment of the present invention, the plate type fluid filter is prepared by the following steps.

First of all, the metal fiber sintered cloth is punched and extended laterally into a corrugated plate 1, wherein the two side ends of the corrugated plate are reserved as 5 mm plain edges, wherein the crest height is 3.8 mm, the crest interval is 8.3 mm.

Secondly, accordingly to different perimeter of the cylinder shape, respective corrugated filtering plate and flat filtering plate are prepared, wherein the perimeters of plurality of plates are gradually increased with a difference margin of 5 mm.

Figure 8:
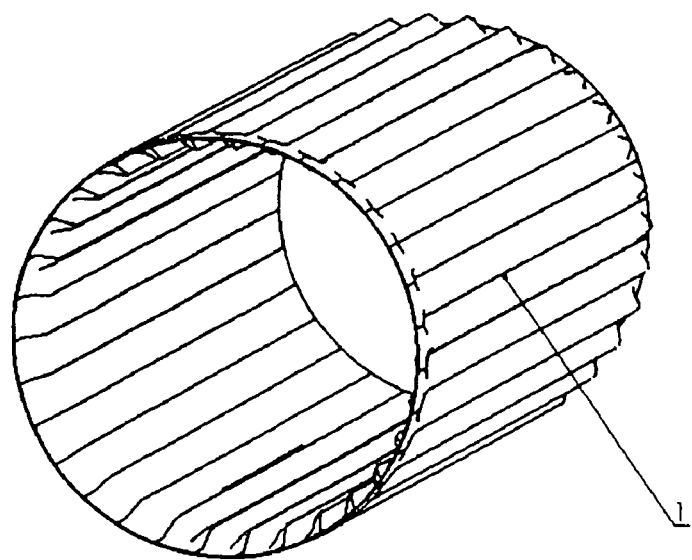
FIG. 8 is a perspective view of a corrugated filtering leaf used in the above tube shape fluid filter according to a preferred embodiment of the present invention.
Figure 9:
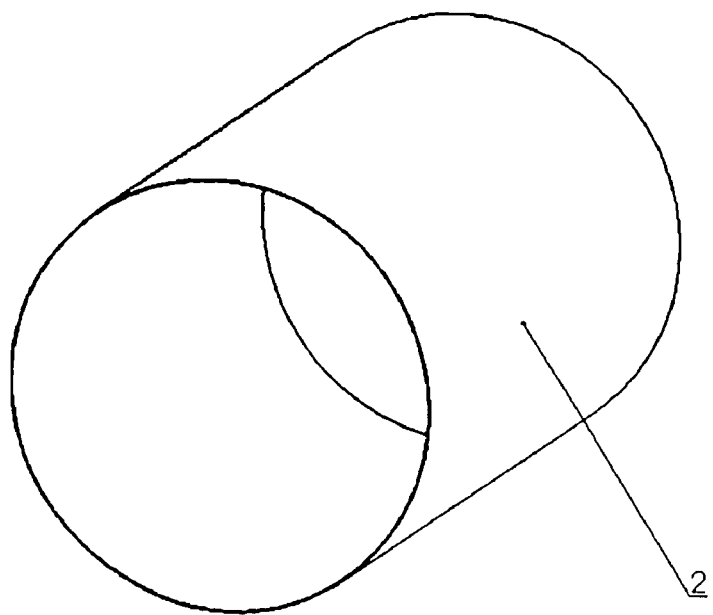
FIG. 9 is a perspective view of a flat filtering leaf used in the above tube shape fluid filter according to a preferred embodiment of the present invention.
Figure 10:
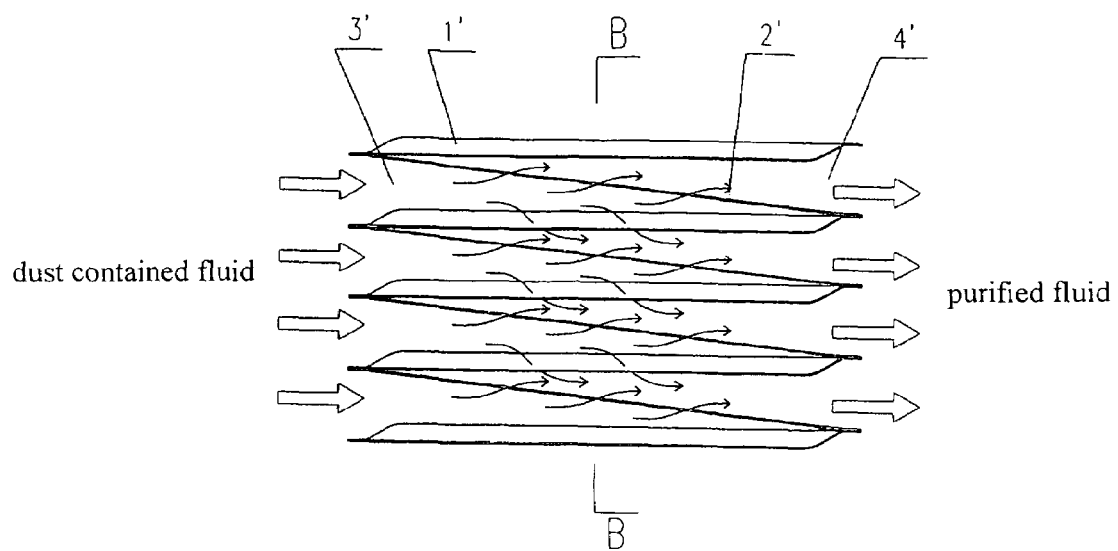
FIG. 10 is a schematic view of the tube shape fluid filter according to a preferred embodiment of the present invention.
Figure 11:
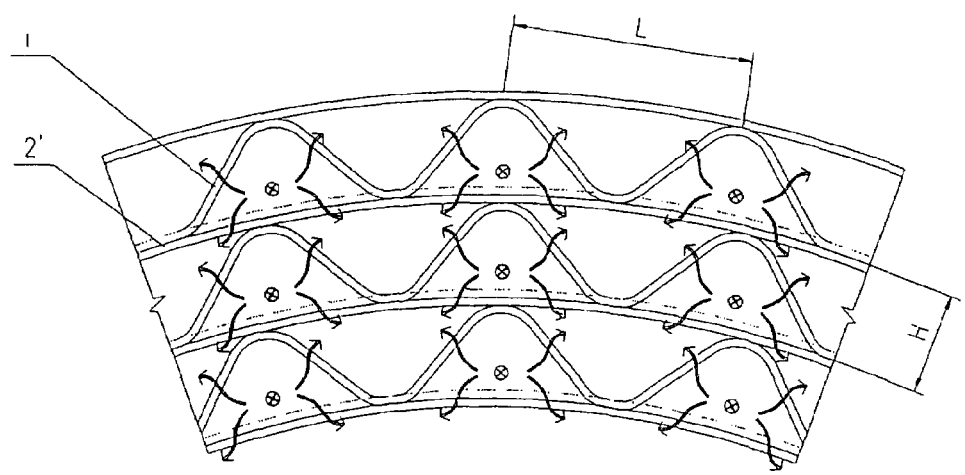
FIG. 11 is a sectional view showing the fluid flowing through above tube shaped fluid filter according to the preferred embodiment of the present invention.

Thirdly, each of the plurality of corrugated filtering plates and the flat filtering plates is rounded up by welding opposed edges to form corrugated filtering rings and flat filtering rings, wherein the overlapped edges margin is 5 mm as shown in FIG. 8 and FIG. 9.

Fourthly, the innermost flat filtering ring is welded onto the center tube 5', afterwards, the corresponding corrugated filtering rings and flat filtering rings are subsequently sleeved onto the center tube 5' to form a cylinder shape filter core, wherein each of corrugate filtering ring is alternated between a pair of flat filtering rings, and vice versa, and more importantly, each of the corrugated filtering rings is respectively welded onto a pair of neighboring flat filtering rings at opposed edges. Finally, such stack core is inserted into the outer casing, wherein the outmost flat filtering ring is welded onto the inner surface of the outer casing for securing purposes.

Finally, a series of test was carried out to illustrate the overall performance of the fluid filter prepared by the present invention.

Smoke intensity: 0.20-0.65 (comply with the Europe Union displacement standard);

Filter efficiency: 85-90%;

Charcoal carrying capacity for one filtering cycle: >=50 g;

Back pressure: <=25 Kpa.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A fluid filter, comprising:

an outer casing; and a filter assembly which is received within said outer casing, and comprises:

a plurality of corrugated filtering plates; and a plurality of flat filtering plates alternated into said corrugated filtering plates to overlap with corrugated filtering plates in a "Z" shape manner so as to form a filter stack of said flat filtering plates and said corrugated filtering plates, wherein each of said corrugated filtering plates has two side plain edges and a corrugated ridge, wherein each of said corrugated filtering plates is respectively welded onto a pair of said neighboring flat filtering plates at opposed edges, such that two sides of said filter stack are enclosed with a "Z" shaped ending respectively as a fluid inlet and a fluid outlet, wherein a height of each layer of said filter stack is ranged between 2-10 mm and a crest interval of each of said corrugated filtering plates is ranged between 4-20 mm, wherein said side plain edge is positioned to be aligned with a central portion of said corrugated ridge, or respectively aligned with an upper portion and a lower portion of said corrugated ridge, wherein two side ends of said corrugated plate are reserved for approximately 5 mm as said plain edges.

2. The fluid filter, as recited in claim 1, wherein two sides of said filter assembly are coated with sealant glue for separating with an inner surface of said outer casing.

3. A fluid filter, comprising:

an outer casing;

a plurality multi-layer corrugated filtering rings;

a plurality of multi-layer flat filtering rings; and a central tube, wherein an innermost layer of said flat filtering ring is welded onto said central tube, an outermost layer of said flat filtering ring is welded onto an inner surface of said outer casing, wherein said multi-layer corrugated filter rings are coaxially alternated within said flat filtering rings and formed with a zigzag manner, wherein side edges of each of said corrugated filtering rings are respectively welded onto neighboring flat filtering rings so as to form a continuous filter core with "Z" shaped side endings, wherein two sides of said "Z" shaped side endings of said filter core are alternatively applied as fluid inlet and fluid outlet in applications, wherein each of said corrugated filtering rings is reserved with two side plain edges and remaining portion of said corrugated filtering rings is prepared corrugated ridge, said plain edge is sized between 3-8 mm, wherein two side ends of said corrugated plate are reserved for approximately 5 mm as said plain edges.

4. The fluid filter, as recited in claim 3, wherein said flat filtering rings has a cylindrical shape.

5. The fluid filter, as recited in claim 4, wherein a height of said corrugated filtering ring and said flat filtering ring combination is ranged between 2-10 mm.

6. The fluid filter, as recited in claim 5, wherein a crest interval between corrugated peaks of each of said corrugated filtering rings is ranged between 4-20 mm.

* * * * *